Oct. 5, 1971  M. L. GREENE ET AL  3,610,037
SEA WATER CESIUM SAMPLER
Filed Dec. 29, 1969
Filed March 26, 1970
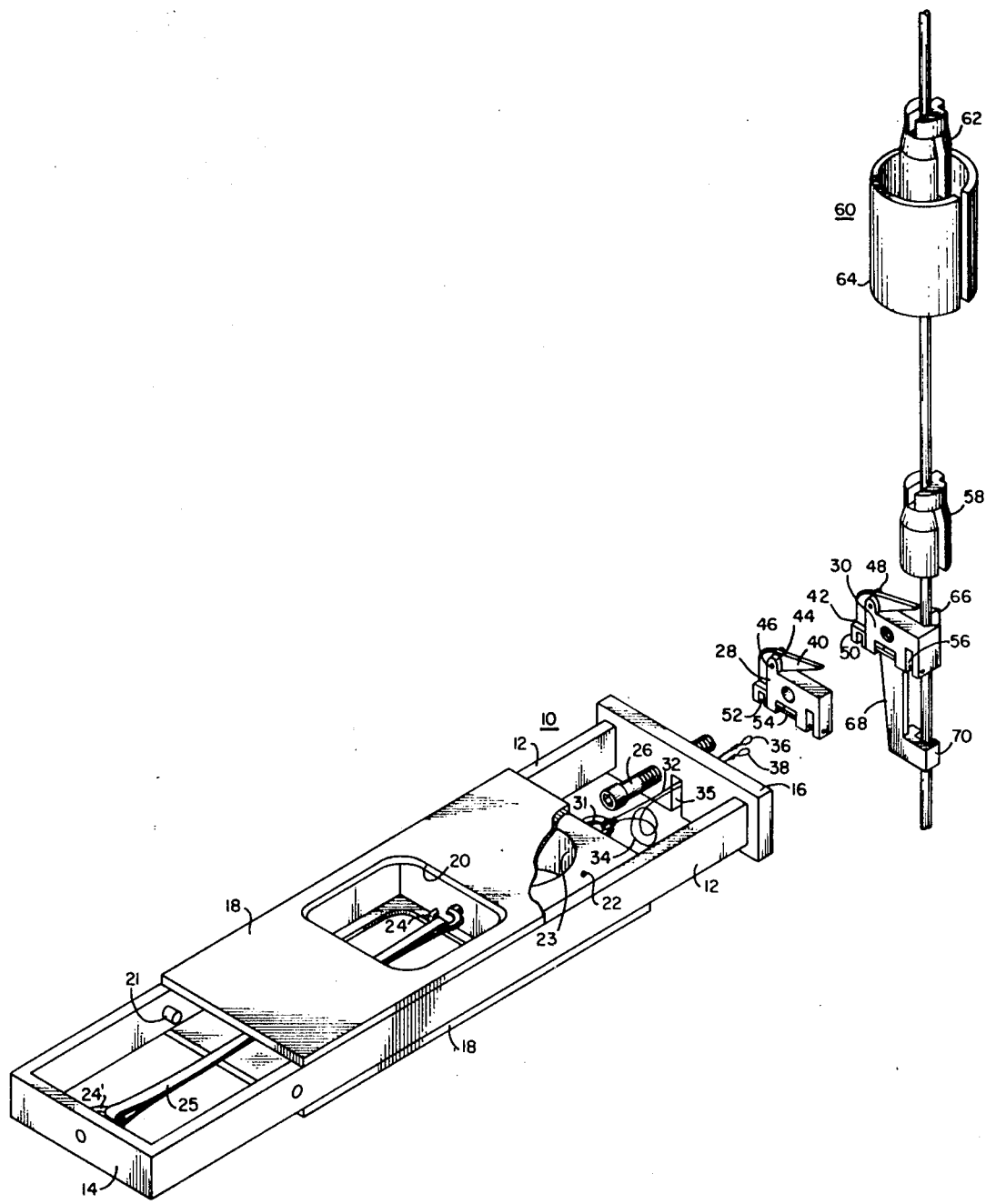
INVENTORS
MICHAEL L. GREENE
JOSEPH R. JADAMEC
BY
ATTORNEY

3,610,037
SEA WATER CESIUM SAMPLER
Michael L. Greene, Hillcrest Heights, Md., and Joseph Richard Jadamec, Woodbridge, Va., assignors to the United States of America as represented by the Secretary of the Navy
Filed Mar. 26, 1970, Ser. No. 22,943
Int. Cl. G01n 1/10
U.S. Cl. 73—170 A                                    3 Claims

ABSTRACT OF THE DISCLOSURE

A water sampling device having a rectangular frame to which is attached on the top and bottom thereof a pair of centrally apertured parallel plates. A shuttle is slideably mounted between the centrally apertured plates within the frame and biased toward one end thereof by an elastic band attached to one end of the shuttle. The shuttle is restrained from movement by a pair of lanyards attached to the other end thereof, one of which connects to a first latch and the other of which connects to a second latch. The first lanyard holds the shuttle out of alignment with the apertures in the parallel plates but may be released from the latch by a messenger sliding down the cable to which the frame is attached. The shuttle is then free to move under the influence of the elastic band until it is stopped by the second lanyard in alignment with the apertures in the parallel plates and thus is fully exposed to contact with the sea water. A second messenger having a tubular portion is later dropped down the wire to telescope with the first messenger and open the second latch which releases the second lanyard and allows the shuttle to be moved by the elastic band out of alignment with the apertures in the parallel plates. The shuttle is again isolated from contact with the sea water and secure from contamination by the water column through which the device is hoisted back aboard the surface vessel.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to water sampling devices and more particularly to devices for exposing a chemical ion exchange composition to sea water at a predetermined depth for the purpose of collecting trace elements at that depth.

In the science of oceanography, it is frequently necessary to obtain a profile of the concentration of certain trace elements, and radionuclides in particular, in the sea water over a predetermined depth range, for example, from the ocean floor to the surface. Since radionuclides are typically present in extremely minute quantities it is necessary that a very large volume of water from each depth of interest be collected to determine their concentration. This need for a large volume of water has necessitated extremely awkward handling procedures. For example, one method currently in use is the lowering of a large bottle approximately six feet long and fifteen inches in diameter to the desired depth and obtaining a 30 gallon sample. The bottle is then hoisted back to the surface vessel and the water is removed and stored. The bottle is then lowered to a second depth and the procedure repeated for each depth in the profile. A typical profile requires the collection of from five to twenty samples. Obviously, a very large storage volume aboard ship is necessary for this procedure.

Another problem attending the use of existing procedures arises because of the long time it takes to collect all five to twenty samples. It is necessary to acomplish the collection of all samples as quickly as possible because the profile is to represent a particular location at a particular time and the probability of the ship retaining its position over extended periods of time decreases as a function of ocean currents and winds.

Another technique which was developed to overcome some of the above-mentioned problems is a device which contains an electrically driven water pump and a filter. The device is lowered to the proper depth and the pump is actuated to pump a predetermined volume of water through the filter which collects the sample of trace elements desired. This device represents a considerable improvement over the first mentioned technique, but it still suffers from the necessity of repeated raisings and lowerings of the device for each sample to be taken. While the storage volume required in the first technique is no longer necessary, the other problems still remain.

There has, therefore, long been a need in the field for a small light-weight inexpensive device which can take an entire profile of radionuclide concentration with a single lowering of the oceanographic wire in a relatively short amount of time and with a negligible storage volume requirement.

SUMMARY OF THE INVENTION

Accordingly, one object of this invention is to provide a sampling device which can be used to take an entire radionuclide profile with a single lowering of the oceanographic cable.

Another object of this invention is to provide a trace element sampler which can be exposed at any desired depth to sample trace elements and then be closed to prevent contamination of the sample taken by sea water from other levels.

A further object of this invention is to provide a trace element sampler which can sample an entire profile of a location of the ocean with one operation and which requires negligible storage facilities on board ship.

Yet another object of this invention is to provide a device attachable to an oceanographic wire that is small, lightweight, inexpensive to manufacture, reliable, and effective for obtaining samples of trace elements at a great depth of the ocean.

Briefly in accordance with one embodiment of this invention, these and other objects are obtained by providing a frame attachable to an oceanographic cable and having affixed to the top and bottom a pair of centrally apertured plates. A shuttle is slideably disposed between the plates and within the frame and is biased toward one end of the frame, but is restrained from movement by a first lanyard attached to one end of the shuttle and held by a first latch. A second lanyard is attached to the same end of the shuttle and held by a second latch. A first messenger can be dropped to slide down the oceanographic wire to strike and open the first latch and release the first lanyard which will permit the shuttle to slide in the frame between the parallel plates to a position in which it is aligned with the central apertures through the plates. A second messenger, having a tubular portion affixed thereto, may be dropped down the oceanographic wire to strike the second latch, opening it to release the second lanyard to permit the shuttle to slide further through the frame out of alignment with the central apertures through the plates. At this position the shuttle is effectively sealed from contact with sea water and the sampling shuttle is secure from contamination from other levels of the ocean as the cable is raised back to the surface vessel.

DESCRIPTION OF THE DRAWING

A more complete appreciation of the invention in its many attendant advantages will develop as the same becomes better understood by reference to the following detailed description when considered in connection with the accompanying sole drawing which shows an exploded isometric view of the sampler attached to a portion of the oceanographic cable on which are placed the two messengers.

DESCRIPTION OF THE PREFERRED EMBODIMENT

Referring now to the drawing, the trace element sampler includes a frame 10 having a pair of parallel legs 12 connected at the rear end by a cross piece 14, and at the front end by a base plate 16. Two plates 18 having central openings or apertures 20 are fixed to the top and bottom respectively of frame 10 and constitute therewith an enclosure which surrounds an open ended, elongate volume. A pair of pegs 21 are secured to the inside of legs 12 adjacent the rear edge of plates 18 for a purpose which will appear presently. An aperture in base plate 16 receives a screw 26 which is threadedly engaged with a pair of latches 28 and 30, holding them rigidly to the forward face of base plate 16.

A shuttle 22 having formed therethrough a central aperture 23 is slideably disposed within the volume encircled by frame 10 and plates 18. An elastic band 25 is streached between a pair of hooks 24 and 24' connected to the rear end of shuttle 22 and the inside of cross piece 14 respectively, and urges shuttle 22 rearward toward cross piece 14. A hook 31 connected to shuttle 22 on the opposite side from hook 24 has secured thereto a pair of lanyards 32 and 34. Lanyard 32 having formed on the end thereof a loop 36, extends through a slot 35 in base plate 16 and is releasably held by latch 30 to hold shuttle 22 in the position illustrated, out of alignment with apertures 20. Lanyard 34, somewhat longer than lanyard 32 also has its end formed in a loop 38 which is held by latch 28 and is of a length to prevent movement of shuttle 22 beyond aperture 20.

The operation of the device as described thus far is as follows: the sampler is connected to an oceanographic cable and lowered into the ocean to the depth desired in the position illustrated in which the shuttle 22 is sandwiched by plates 18 and the material in aperture 23 of shuttle 22 is isolated from contact with the sea water. At the desired depth latch 30 is opened to release lanyard 32 and permit movement of shuttle 22 under the influence of elastic band 25 to a position at which it is stopped by lanyard 34. At this position aperture 23 is aligned with apertures 20 in plates 18 and exposure of the material in aperture 23 to the sea water commences. When the period of exposure to the sea water is wished terminated, the second latch 28 is opened to release lanyard 34 and permit shuttle 22 to be moved by elastic band 25 toward cross piece 14 until it engages pegs 21 and is stopped in that position. At that time shuttle 22 is again sandwiched by the solid portion of plates 18, and the material held in aperture 23 is isolated from contact with the sea water.

The mode by which latches 28 and 30 are opened will now be described. Both latches 28 and 30 are identical as regards their latching functions. A trigger 40 having a vertical leg portion 42 is held between the bifurcated legs of a clevis 44 formed on top of the body of the latch and through which a pivot pin 46 extends. A torsion spring 48, not seen in the drawing, is coiled coaxially with pivot pin 46 and urges counterclockwise rotation of trigger 40. The lower end of leg portion 42 has formed thereon a fork 50 which straddles the enlarged head 52 of a pin 54. Pin 54 extends through a bore formed in the lower portion of the latch body and into a slot 56 cut into the lower portion of one end of the latch body. The loops 36 and 38 of lanyards 32 and 34 respectively are received in slots 56 of latches 30 and 28 respectively, and pin 54 passes through loops 36 and 38 to securely hold them in position until pins 54 are withdrawn from slots 56 to release them. Thus it is seen when trigger 40 is depressed, leg 42 will rotate away from the latch body and fork 50 on the end of leg 42, engaging the head 52 of pin 54, withdraws pin 54 partially through the bore in the latch body for sufficient distance to free the loop of the respective lanyard.

The technique for operating the triggers of latches 30 and 28 will now be described. A first messenger 58 which is a simple brass cylinder having a slot cut halfway thereinto and a top having a slot similarly cut thereinto, but which may be misaligned with the slot in the body portion to secure the messenger to the cable, is slid down the cable and strikes the trigger 40. Trigger 40 is thus depressed and pin 54 is withdrawn to free lanyard loop 36 and permit shuttle 22 to move into alignment with apertures 20 in plates 18. After the required exposure time the second messenger 60 is released to slide down the cable. Messenger 60 includes a central portion 62 which is identical to the first messenger 58 and collar or tubular portion 64 secured to central portion 62 and extending below the lower face of central portion 62 a distance at least equal to the height of the first messenger 58. The radius of collar portion 64 is equal to the radial distance of trigger 40 of latch 28 from the oceanographic cable so that collar portion 64 will telescope with the first messenger 58 and strike trigger 40 of latch 28. When the second messenger opens latch 28, loop 38 of lanyard 34 is released from slot 56 of latch 28 to permit shuttle 22 to slide out of alignment with aperture 20 and thus terminate the exposure of shuttle 22 with the sea water.

Clamp 30 has formed on the outer side thereof a clamp 66 by which the device may be secured at any point along the oceanographic cable. Extending downward from clamp 30 is a leg 68 to the lower end of which is attached a slotted foot 70 and which constitutes a moment arm long enough to provide sufficient moment to counter the moment exerted by the device.

Aperture 23 in shuttle 22 contains a filter material which contains a substance that is effective to extract the trace element desired to be identified from the sea water. In the particular use for which the device was designed, the filter material contains zirconium ferro-cyanide resin which is chemically effective to extract cesium 137 from the ocean water. When the cable is in position with a series of these devices fixed at various levels along the cable the movement of the ship as it rides up and down on the waves at the surface is effective to move the filter material up and down through the water and thereby cause a sufficient volume of water passing through the filter to provide an accurate sample. The shuttles are then closed to the position in which the aperture 23 is no longer exposed to the sea water and the device is hoisted back aboard ship and the filter elements are removed and returned to the laboratory for analysis. In operation, a series of devices as described are clamped at predetermined intervals along an oceanographic cable which is lowered into the ocean. When the cable is in position, a first messenger 58 is released to slide down the wire and contact the first device and open the first latch. This is effective to release lanyard 32 and also release a first auxiliary messenger which is hanging from its lanyard held by pin 54. The first auxiliary messenger then slides down the wire to contact the second device along the wire. The cycle is repeated for the entire length of the oceanographic wire and all the devices are opened in this way. When it is desired to close or seal shuttles 22, the second messenger 60 is released. The second messenger releases shuttle 22 as described above, and also releases a second auxiliary messenger, identical to messenger 60, which hangs from its lanyard from pin 54 in latch 28. The second auxiliary messenger slides down the cable until it strikes the trigger 40 of latch 28 on the next device. This cycle repeated for each device until all the shuttles are closed.

Obviously, numerous modifications and variations of the present invention are possible in light of the above teachings. For example, the device could be designed with several shuttles to achieve different exposure times. In such an arrangement, there would be as many latches as needed and a messenger for each latch, its collar being slightly larger in diameter than the previous messenger. It is therefore to be understood that within the scope of the appended claims the invention may be practiced otherwise than as specifically described herein.

What is claimed and desired to be secured by Letters Patent of the United States is:

1. An ocean water trace element sampler, comprising:
   enclosure means including a rectangular frame and a pair of parallel plates fixed to the upper and lower sides of said frame respectively and enclosing therewith a volume open at both ends;
   means for attaching said enclosure means to a cable;
   a shuttle slideably disposed within said volume;
   an opening formed in said enclosure means for exposing said shuttle to the ambient environment around said enclosure means;
   biasing means for urging said shuttle toward said opening;
   means for releasably restraining said shuttle from movement;
   means for releasing said restraining means to permit movement of said shuttle under the influence of said biasing means into alignment with said opening and then a predetermined time thereafter, out of alignment therewith.

2. The sampling apparatus defined in claim 1, wherein said restraining means comprises:
   a pair of latches mounted on said frame;
   a pair of lanyards, a respective end of each being held by a respective one of said latches, and the other end of both being connected to said shuttle;
   one of said lanyards holding said shuttle between said plates out of alignment with said opening;
   the other of said lanyards being a length to restrain movement of said shuttle beyond alignment of said opening;
   whereby when one of said latches releases said one lanyard, said shuttle moves under the influence of said biasing means into alignment with said opening where it is restrained from further movement by said other lanyard, then when said other lanyard is released from the other of said latches, said shuttle moves under the influence of said biasing means out of alignment with said opening.

3. The water sampling apparatus defined in claim 2, wherein:
   said restraining means comprises a first and a second messenger slideably secured to said cable, said second messenger having a tubular portion with an inside diameter greater than the outside diameter of said messenger, and a length greater than the length of said first messenger;
   whereby said first messenger can slide down said cable to open said one latch and release said shuttle to move into alignment with said apertures, and said second messenger can slide down said cable and telescope with said first messenger to open said other latch and release said shuttle to move out of alignment with said apertures.

References Cited

UNITED STATES PATENTS

| | | | |
|---|---|---|---|
| 3,218,869 | 11/1965 | Fields et al. | 73—425.4 |
| 3,266,323 | 8/1966 | Buchanan et al. | 73—425.4 |
| 3,277,723 | 10/1966 | Bodman et al. | 73—425.4 |
| 3,531,995 | 10/1970 | Barker | 73—425.4 |

RICHARD C. QUIESSER, Primary Examiner

A. E. KORKOSZ, Assistant Examiner

U.S. Cl. X.R.

73—425.4